(12) United States Patent
Quinn

(10) Patent No.: US 10,124,620 B2
(45) Date of Patent: Nov. 13, 2018

(54) MULTI-IMAGE OPTICAL DEVICE

(71) Applicant: Graphic Security Systems Corporation, Lake Worth, FL (US)

(72) Inventor: Cary M. Quinn, West Palm Beach, FL (US)

(73) Assignee: Graphic Security Systems Corporation, Lake Worth, FL (US)

( * ) Notice: Subject to any disclaimer, the term of this patent is extended or adjusted under 35 U.S.C. 154(b) by 30 days.

(21) Appl. No.: 13/801,249

(22) Filed: Mar. 13, 2013

(65) Prior Publication Data

US 2013/0264813 A1    Oct. 10, 2013

Related U.S. Application Data

(60) Provisional application No. 61/609,979, filed on Mar. 13, 2012, provisional application No. 61/734,752, filed on Dec. 7, 2012.

(51) Int. Cl.
| | |
|---|---|
| *B42D 15/00* | (2006.01) |
| *B42D 15/10* | (2006.01) |
| *B41M 3/10* | (2006.01) |
| *G02B 5/20* | (2006.01) |
| *G02B 5/22* | (2006.01) |

(52) U.S. Cl.
CPC .............. *B42D 15/00* (2013.01); *B41M 3/10* (2013.01); *G02B 5/201* (2013.01); *G02B 5/223* (2013.01)

(58) Field of Classification Search
CPC ........ B42D 15/00; B42D 15/10; G02B 5/201; G02B 5/223; B41M 3/10

USPC .............. 283/67, 72, 84, 91, 93, 94, 98, 901
See application file for complete search history.

(56) References Cited

U.S. PATENT DOCUMENTS

| | | | | |
|---|---|---|---|---|
| 5,267,755 A | * | 12/1993 | Yamauchi ............... | B32B 38/14 283/109 |
| 2006/0061088 A1 | * | 3/2006 | Harrington .......... | G07D 7/2058 283/51 |
| 2009/0072526 A1 | * | 3/2009 | Peters ................. | B42D 25/328 283/85 |
| 2010/0164219 A1 | * | 7/2010 | Jeacock ............... | B42D 25/369 283/94 |
| 2011/0101670 A1 | * | 5/2011 | Heim ..................... | G02B 5/283 283/85 |
| 2013/0181435 A1 | * | 7/2013 | Hersch ................. | H04N 1/6058 283/85 |

* cited by examiner

*Primary Examiner* — Justin V Lewis
(74) *Attorney, Agent, or Firm* — Ingram IP Law, P.A.

(57) ABSTRACT

A system and method are provided for constructing an optical device having a substrate and a filter layer provided on the substrate. The filter layer includes features that render a first image and gaps between the features. An image layer is provided on the filter layer and includes image elements provided within the gaps between the features. The first image is rendered in reflected light and the second image is rendered in transmitted light. According to one example, a second filter layer may be provided on a second side of the substrate such that features of the filter layer and second features of the second filter layer may be at least partially out of vertical alignment in order to define a plurality of light ray entry angles.

23 Claims, 16 Drawing Sheets

= Filter

= Partial Image 1

= Partial Image 2

= Filler to
  Conceal Partial Image 1

= Filler to
  Conceal for Partial Image 2

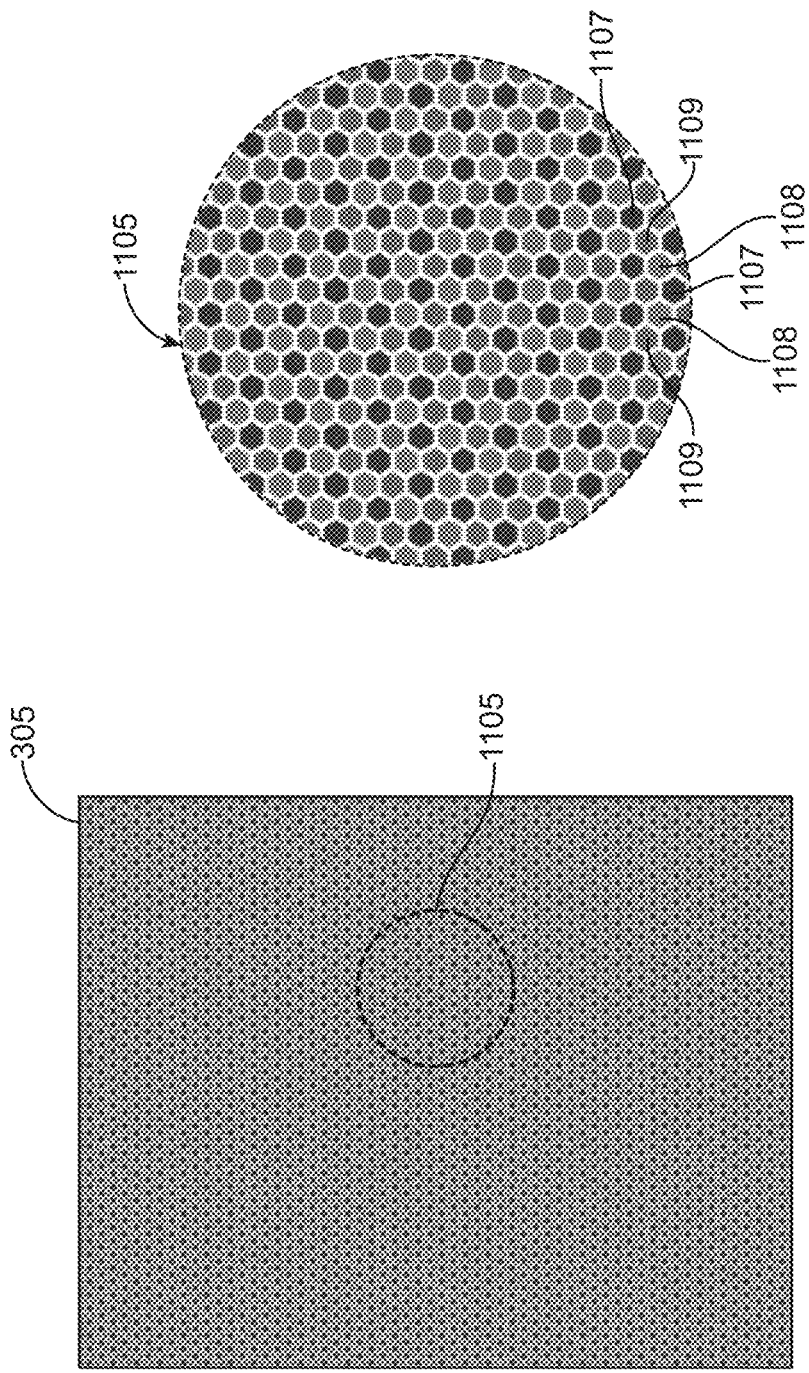

MULTI-IMAGE OPTICAL DEVICE

CROSS REFERENCE TO RELATED APPLICATIONS

This application claims priority to U.S. Provisional Application 61/609,979, filed Mar. 13, 2012 and U.S. Provisional Application 61/734,752, filed on Dec. 7, 2012, the complete disclosures of which are incorporated herein by reference in their entirety.

FIELD OF THE TECHNOLOGY

The present disclosure relates generally to images, and more specifically to images having optical features applied to substrates, and still more specifically to images having optical security features applied to substrates using precision techniques.

BACKGROUND OF THE INVENTION

Known optical security features include semi-covert images or watermark images applied to high-security documents such as banknotes. Watermark images have become well-known features for authenticating documents due in part to public familiarity and ease of use. Non-printed optical watermark images are introduced into selected areas of a document or substrate by varying a thickness of the substrate during a substrate manufacturing process. For example, a press having a desired texture pattern is rolled over the substrate to vary the thickness of the substrate according to the desired texture pattern. Variations in the substrate thickness modify translucent characteristics of the substrate, which may be viewed by holding the substrate against a light source or backlight to verify the presence of an anticipated watermark image.

One limitation of known non-printed optical watermarks is a lack of design complexity. Early non-printed optical watermarks were generally produced using a "dandy roll" manufacturing process that impresses a wet rolling stamp onto the paper prior to drying. These non-printed optical watermarks are prevalent in banknotes and are generally simple in design. The watermark designs often depict a portrait with minimal tonal or density variations. Another limitation of known non-printed optical watermarks is an inability to incorporate color into the watermark effect. Other non-printed optical watermarks utilized a "cylinder mould" manufacturing process that simulated true grayscale images using significant tonal and density variations. Both of these manufacturing processes are limited to producing grayscale images. In other words, these manufacturing processes are not capable of incorporating color into the watermark effect.

Additionally, any design that is printed on the front or back of the substrate should include a simple design to allow for optimal readability of the non-printed optical watermarks since it is difficult to align the printed image relative to the known non-printed optical watermarks. This is due to the watermark being created as a separate component from the printed image. In other words, the document printing does not occur "in-line" with generation of the non-printed optical watermarks. Therefore, additional measures are needed to ensure proper registration between the printed image and known non-printed optical watermarks.

Another limitation of non-printed optical watermarks is a lack of design integration flexibility. Since the non-printed optical watermarks are produced during the substrate manufacturing process, there is a limited opportunity to integrate a desired design into the substrate.

Yet another limitation of technology associated with known non-printed optical watermarks is general application to milled paper substrates. In other words, this technology has limited extension to paperless applications, such as polymer substrates and materials.

Additional limitations of known non-printed optical watermarks applied to banknote features is a low security level attributable to risk of simulation, process availability, and material chain of custody. For example, a substrate may include pre-printed images that simulate non-printed optical watermarks.

With respect to simulation of a non-printed optical watermark, the variable transparency introduced into known non-printed optical watermarks can be mimicked using a pre-printed document base substrate having an opaque ink that is printed prior to printing the visible document design. If a shade of ink is applied that is similar to a shade of the base substrate, the introduction of the pre-printed image may be difficult to detect; particularly after the pre-printed image is overprinted with a complex color design. The pre-printed image can include a negative image that, when backlit, reduces the transparency of the areas containing the opaque ink compared to the areas without the opaque ink. This effect can be controlled to appear in the form of a grayscale image that would be seen in non-printed optical watermarks. This method achieves a same level of covertness as non-printed optical watermarks. In fact, some polymer banknotes implement pre-printed image features intentionally, for use with transparent windows.

With respect to availability, manufacturing processes for producing known non-printed optical watermarks are becoming commonly available. There is no apparent regulation preventing entities other than accredited high-security printers with access to the manufacturing equipment. Therefore, known non-printed optical watermarks manufacturing processes are commercially available to standard non-security paper manufacturers.

With respect to material chain of custody, since known non-printed optical watermarks are contained within base substrates, extra measures are needed to ensure that all pre-manufactured material is accounted for and that any unused material is destroyed. Otherwise, counterfeiters having access to substrates with non-printed optical watermarks could pass off the substrate as an authentic substrate.

BRIEF DESCRIPTION OF THE DRAWING

FIG. 11A illustrates a color image layer having a static color pattern according to one example of the disclosure;

FIG. 11B illustrates a magnified view of a portion of FIG. 11A according to one example of the disclosure;

DETAILED DESCRIPTION OF THE INVENTION

Figure 1A:
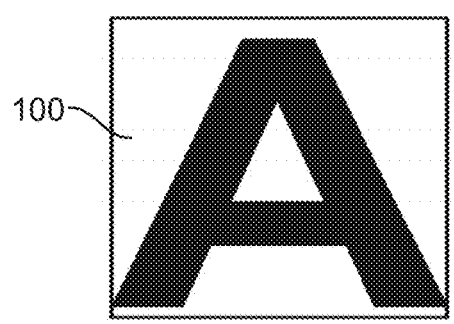
FIGS. 1A-1D illustrate images that are processed to create image designs and a filter image according to one example of the disclosure.

Various examples are described herein for generating images on a substrate, the images being configured to form watermark features for authenticating the substrate bearing the watermark. Watermarks may be used as security features on substrates to prevent counterfeiting. While specific examples are disclosed, it should be understood that this is for illustration purposes only. A person skilled in the relevant art will recognize that other components and configurations may be used without departing from the spirit of the disclosure.

Throughout this disclosure, the term "substrate" includes a paper substrate, a polymer substrate, a polycarbonate substrate, a plastic substrate, a foil substrate, a film substrate, or the like. The substrate may have an image placed thereon to render documents, such as banknotes, passports, identification card, or the like. This disclosure can be applied to documents used in security, marketing, packaging appeal, consumer interaction products, or the like. The images may include text, graphics, photographs, multimedia images, and/or other images. The images may be rendered using a dot pattern, such as a two-dimensional ("2-D") dot array. In one example, the images may be physically rendered on the substrate using an imaging device, such as a printer or the like. According to one example, a paper substrate may include semi translucent properties that enable the paper substrate to operate as a semi-opaque filter. Alternatively, the term "substrate" may include an electronic substrate and the images may be electronically rendered using an imaging device, such a display or the like.

Systems and methods are provided for incorporating optical features on substrates to enable visual authentication of the substrate. The optical features or watermarks are configured to become visible when light rays reflect from the optical feature or transmit through the optical feature incorporated on the substrate. In one example, the optical features may be created using continuous-tone features, spot color features, grayscale/monotone features, color-shifting features, holography, diffractive features, or kinetic features. The diffractive or kinetic features may be rendered using specialty inks. According to one example, one or more surfaces of the document may be covered in a layer of clear printer's varnish. In an alternative embodiment, unique variable images may be generated on the electronic substrate using software.

The substrate may include a filter screen that includes transparent areas embedded within reflective portions having translucent areas. The reflective portions of the filter screen may be made of any material or substance that reflects light, minimally transmits light, or does not transmit light. Examples include white opaque ink and perforated foil. Authentication is performed in a similar way to that of optical watermarks such as by holding the optical device up to light or moving the optical device to receive different angles of light. The visual effects may be more advanced than a conventional optical watermark. The disclosure supports depicting at least two different color images that are visible in normal reflected lighting conditions and at least one other separate image that may be revealed by holding the document up to a light source. The design complexity and color content of each of the images is virtually limitless, lending this disclosure to new and creative applications. Content may be variable or unique for each unit.

Figure 1B:
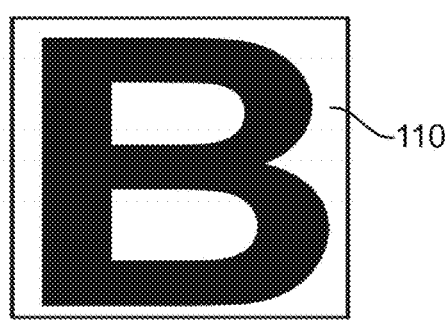
Figure 1C:
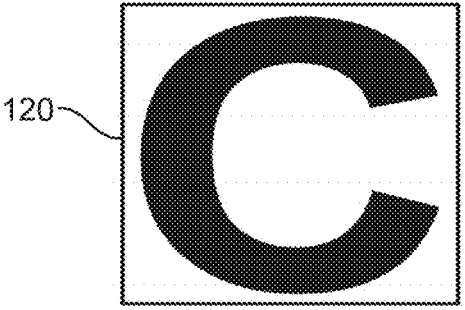
Figure 1D:
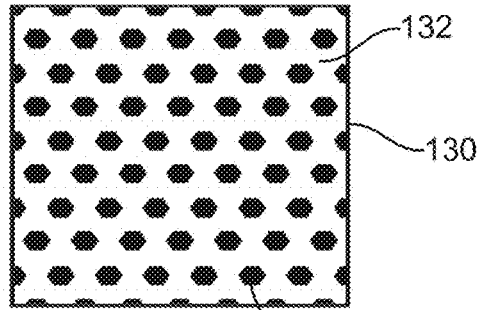

FIGS. 1A-1D illustrate an example of various full-tone images that may be processed to create image designs that are incorporated as optical patterns or features on the substrate, including a first image "A" 100 in FIG. 1A, a second image "B" 110 in FIG. 1B, and a third image "C" 120 in FIG. 1C. FIG. 1D illustrates a filter image 130 for a filter layer 320 applied to the substrate as described below with reference to FIG. 3. The filter layer 320 is adapted to filter light impinging on the substrate. The filter image 130 defines a translucent portion 132 of the filter layer 320 that prevents light from passing through to the substrate. The filter image 130 defines a transparent portion 134 of the filter layer 320 that allows light to pass through to the substrate. According to one example, the translucent portion 132 of the filter layer 320 may include opaque or reflective properties. The opaque properties block light rays that impinge on the filter layer 320. By contrast, the reflective properties reflect light rays that impinge on the filter layer 320. Reflective properties include a quality of deflecting light rays back upon impinging a material as opposed to a quality of allowing light rays to pass through a material. According to one example, the filter layer 320 may include both opaque and reflective properties. The filter layer 320 may be configured with various filter image designs, including complex patterns, geometric structures, or the like. More specifically, for example, the filter image 130 or screen may include regular microarray patterns, irregular microarray patterns, non-uniform patterns, textured patterns, different shapes, pictures screens and micro text, indicia, or the like. According to one example, filter layer 320 may include greater reflective or opaque properties compared to the substrate 310.

Figure 2A:
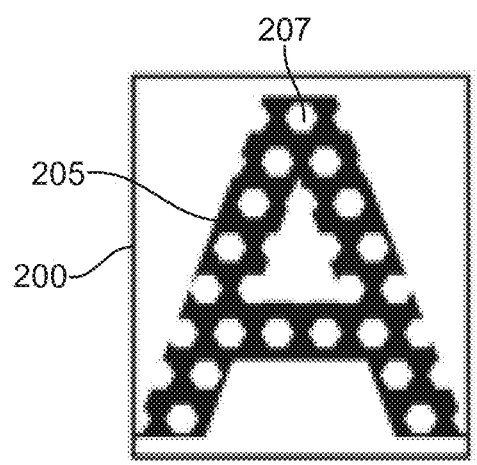
FIGS. 2A-2D illustrate half tone optical image features and an inverted filter image according to one example of the disclosure corresponding to the components from FIGS. 1A-1D illustrate.
Figure 2B:
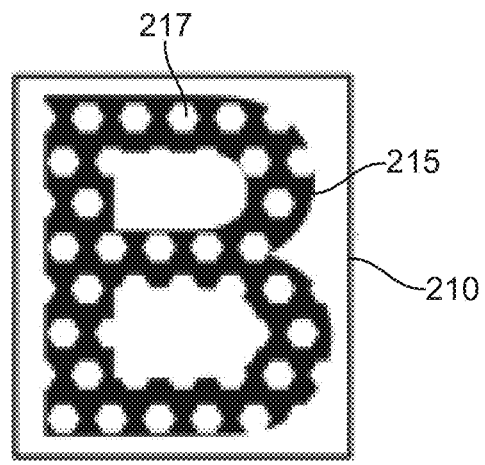
Figure 2C:
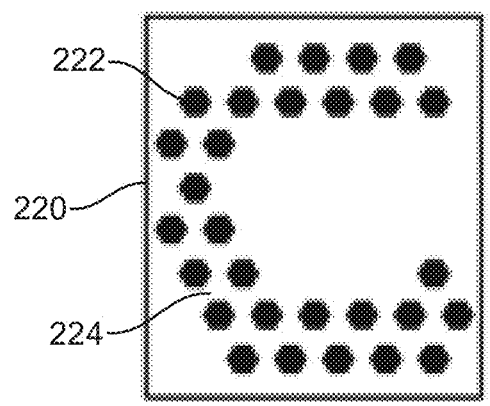
Figure 2D:
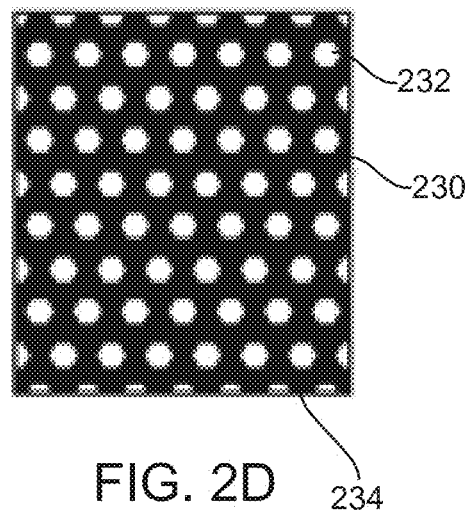

FIGS. 2A-2D illustrate an example of various half-tone images that may be incorporated as optical patterns or features on the substrate 310, including a converted first image "A" 200 in FIG. 2A, a converted second image "B" 210 in FIG. 2B, and a converted third image "C" 220 in FIG.

2C. The converted first image "A" 200 and the converted second image "B" 210 include design patterns that correspond to the design pattern of the filter image 130 in FIG. 1D. According to one example, the converted first image "A" 200 and the converted second image "B" 210 may be formed by performing a reverse masking operation of the filter image 130. Upon performing the reverse masking operation, the light transmitting image elements, such as black ink portion 205 of the converted first image "A" 200 and the black ink portion 215 of the converted second image "B" 210 correspond to the translucent portion 132 of the filter image 130. Furthermore, the no ink portions 207 of the converted first image "A" 200 and the no ink portions 217 of the converted second image "B" 210 correspond to the transparent portion 134 of the filter image 130. To perform the reverse masking operation, the filter image 130 is overlaid and aligned on the first image "A" 100 and ink may be removed from areas 207 of the converted first image "A" 200, which correspond to the transparent portion 134 of the filter image 130. By contrast, the image elements such as ink features are maintained in the ink area 205 of the converted first image "A" 200, which corresponds to the translucent portion 132 of the filter image 130. According to one example, the translucent portion 132 may include ink, toners, or the like.

With respect to the converted third image "C" 220, an inverted masking operation is performed using the filter image 130. The inverted masking operation provides results that are opposite to the reverse masking operation. As illustrated, the image elements such as black ink portions 222 of the converted third image "C" 220, correspond to the transparent portion 134 of the filter image 130. The no ink portion 224 of the converted third image "C" 220 corresponds to the translucent portion 132 of the filter image 130. To perform the inverse masking operation, the filter image 130 is overlaid and aligned on the third image "C" 120 and the image elements such as ink portions are maintained in the ink areas 222 of the converted third image "C" 220, which corresponds to the transparent portion 134 of the filter image 130. By contrast, the image elements or ink features are removed from the areas 224 of the converted third image "C" 220, which corresponds to the translucent portion 132 of the filter image 130. The inverse masking operation also may be performed on the filter image 130 to produce the inverse filter image 230 illustrated in FIG. 2D, which defines a translucent portion 232 that prevents light from passing through to the substrate and a transparent portion 234 of the filter layer 320 that allows light to pass through to the substrate. One of ordinary skill in the art will readily appreciate that other operations may be employed to create complex images such as images generated using color shift technology or holography. For example, when generating a hologram "cast and cure" or registered perforation operations may be employed.

Figure 3:
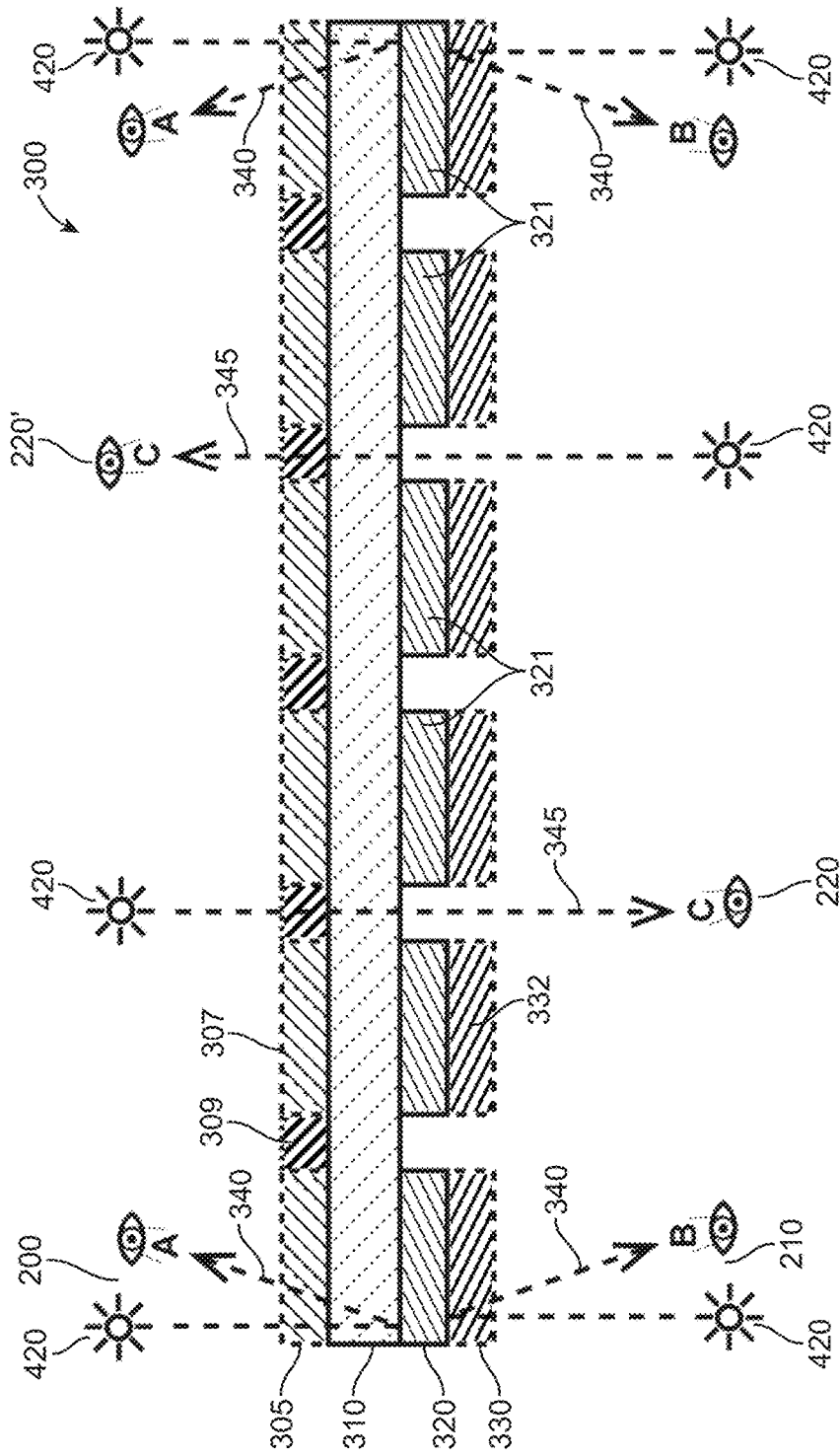
FIG. 3 illustrates a cross-sectional view of a document according to one example of the disclosure.

FIG. 3 illustrates one example of a document 300 depicted in a cross-sectional view. The document 300 includes a first image layer 305 deposited on a first side of the substrate 310. The substrate 310 may be transparent, translucent, semi-translucent, or a combination of these. According to one example, the substrate may be chemically treated with a resin to convert a previously opaque substrate to a more translucent substrate. The first image layer 305 may include first image elements 307 and third image elements 309. The first image elements 307 are configured to render the half-tone or converted first image "A" 200 illustrated in FIG. 2A. The third image elements 309 are configured to render the half-tone or converted third image "C" 220 illustrated in FIG. 2C. According to one example, the converted first image "A" 200 and the converted third image "C" 220 are embedded within a same area of the substrate 310. In other words, the 2-D dot array that renders the converted first image "A" 200 is provided on a same area of the substrate 310 as the 2-D dot array that renders the converted third image "C" 220. This concept is illustrated with reference to FIGS. 4A, 4B, 5A, and 5B.

Figure 4A:
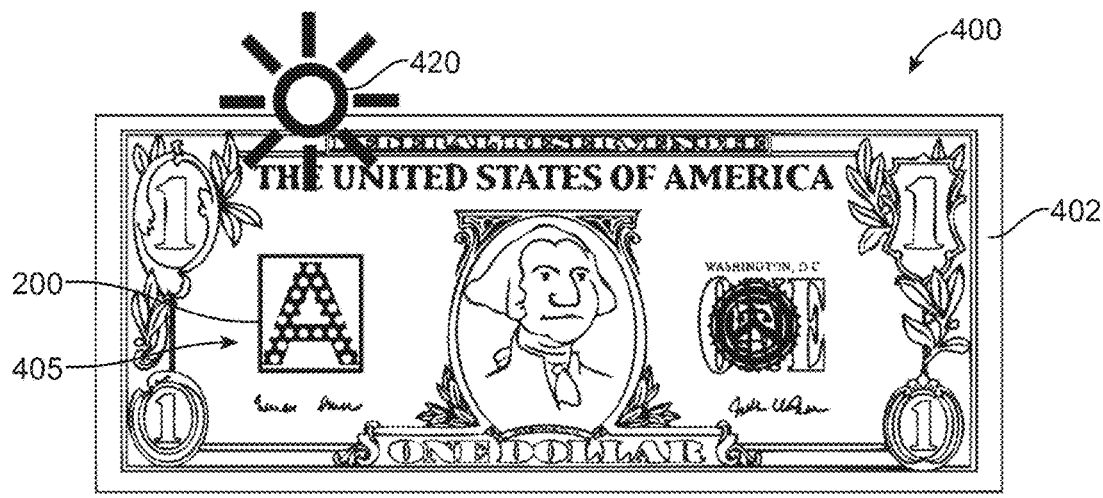
FIG. 4A illustrates a front view of a document subjected to reflected light according to one example of the disclosure.
Figure 4B:
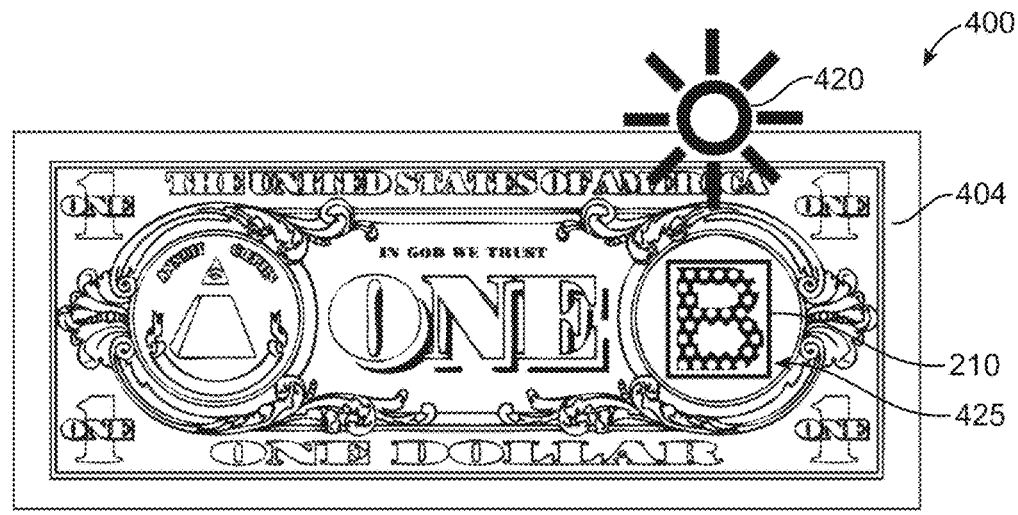
FIG. 4B illustrates a back view of a document subjected to reflected light according to one example of the disclosure.

FIGS. 4A and 4B illustrate a two-sided replica of a banknote 400 viewed using reflected light rays that emanate from a light source 420. FIG. 4A illustrates a first side 402 of the banknote 400 and FIG. 4B illustrates a second side 404 of the banknote 400. The first side 402 includes the converted first image "A" 200 positioned within a first area 405 and the second side 404 includes the half-tone or converted second image "B" 210 positioned within a second area 425. The converted first image "A" 200 and the converted second image "B" 210 are revealed or rendered when the light rays reflect off the first area 405 and the second area 425. According to one example, the reflected image is a tone image, such as a single color, including green, gray, blue, or the like. According to one example, the reflected image is variable. According to one example, the reflected image may be color-shifting, diffractive, or kinetic, through use of specialty inks, holography and/or other advanced optical techniques or materials. One of ordinary skill in the art will readily appreciate that the converted first image "A" 200 and the converted second image "B" 210 may be provided on the first side 402, the second side 404, or on a same side of the banknote 400.

Figure 5A:
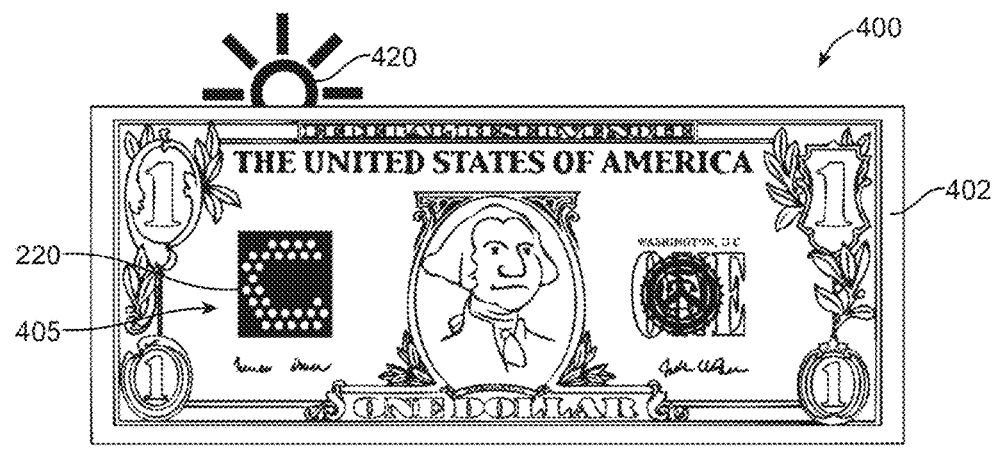
FIG. 5A illustrates a front view of a document subjected to transmitted light according to one example of the disclosure.
Figure 5B:
FIG. 5B illustrates a back view of a document subjected to transmitted light according to one example of the disclosure.

FIGS. 5A and 5B illustrate the same two-sided replica of the banknote 400 viewed using transmitted light rays that emanate from the light source 420. FIG. 5A illustrates the first side 402 of the banknote 400 and FIG. 5B illustrates the second side 404 of the banknote 400. The first side 402 includes the converted third image "C" 220 positioned within the first area 405. The first area 405 illustrated in both FIGS. 4A and 5A are the same first area 405, which contains both the converted first image "A" 200 and the converted third image "C" 220. The second side 404 includes the converted third image "C" 220' in a reverse orientation or a flipped orientation relative to the converted third image "C" 220 provided on the first side 402. The flipped converted third image "C" 220' is positioned within the second area 425.

FIGS. 4B and 5B both illustrate the same second area 425, which contains both the converted first image "B" 210 and the flipped converted third image "C" 220'. The converted third image "C" 220 is revealed when the banknote 400 is viewed from the first side 402 and the light rays are transmitted through the first area 405. Accordingly, the first area 405 reveals two different images depending on whether the light rays are reflected off or transmitted through the first area 405. The flipped converted third image "C" 220' is revealed when the banknote 400 is viewed from the second side 404 and the light rays are transmitted through the second area 425. Accordingly, the second area 425 reveals two different images depending on whether the light rays are reflected off or transmitted through the second area 425. One of ordinary skill in the art will readily appreciate that the converted third image "C" 220 and the flipped converted third image "C" 220' may be provided on the first side 402, the second side 404, or on a same side of the banknote 400.

Referring again to FIG. 3, the document 300 further includes a filter layer 320 provided on a second side of the substrate 310, which is opposite to the first side of the substrate 310. According to one example, the filter layer may include matte properties to reflect light rather than transmit light. According to one example, a second image layer 330 is provided on the filter layer 320. The second image layer 330 may be provided to substantially coincide with a geometry of an upper surface of the filter layer 320 such that the second image layer 330 is not provided on side walls of the filter layer 320 nor on the substrate 310. The second image layer 330 includes second image elements 332 that render the converted second image "B" 210. According to one example, the second image elements 332 are provided on the filter layer 320 in alignment with the features 321 of the filter layer 320. According to one example, the reflected image may be formed from inherent qualities of the filter layer 320 constructed using reflective inks, a foil grating, or the like. According to one example, the features 321 may include multiple filter layers and transparent or translucent substrates.

According to another example, the second image layer 330 may include the second image elements 332 and the third image elements 309. In this case, the third image elements 309 may be embedded within the same area on the filter layer 320. Still further, the third image elements 309 may be provided on a separate layer from the first image layer 305 and the second image layer 330. According to one example, the first image elements 307 may be deposited in alignment with the features 321 of the filter layer 320. According to one example, the third image elements 309 may be provided out of alignment with the features 321 of the filter layer 320. For example, the third image elements 309 may be provided between features 321 of the filter layer 320. One of ordinary skill in the art will readily appreciate that the filter layer 320 may be provided on either side or both sides of the substrate 310.

According to one example, the filter layer 320 may include a reflective filter screen, an opaque filter screen, or a combination of both. The filter layer 320 may be printed or imaged with inks, light-shaded inks, reflective inks, dyes, toners, foils, reflective and non-reflective non-grated foils, holograms, metalized and de-metalized holograms, or the like. The filter layer 320 also may be printed or imaged with optically variable devices ("OVDs") such as lenticular, microarray systems, polarization systems, or the like. According to one example, the filter layer 320 may include micro text. According to one example, the micro text may be variable. The filter layer 320 may be printed or imaged using materials that include inverting transmission properties depending on whether the filter layer 320 is front-lit by reflected light rays or backlit by transmitted light rays. According to one example, images created using materials having inverting transmission properties appear as positive contrast in reflected lighting and negative contrast in transmitted lighting. The filter layer 320 may include a half tone screen having a single density. Alternatively, the filter layer 320 may include a halftone screen having a multiple densities.

FIG. 3 further illustrates visual effects caused by light rays impinging on the document 300. For example, light rays 340 reflected off the filter layer 320 reveal images associated with the image elements provided in alignment with the features 321 of the filter layer 320. The light rays 340 reflect off the filter layer 320 and travel through the first image elements 307 of the first image layer 305 to reveal the converted first image "A" 200 when viewed from a perspective above the substrate 310 in FIG. 3. The light rays 340 reflect off the filter layer 320 and travel through the second image elements 332 of the second image layer 330 to reveal the converted second image "B" 210 when viewed from a perspective below the substrate 310 in FIG. 3. In this example, the converted first image "A" 200 and the converted second image "B" 210 are placed on opposite sides of the substrate 310. One of ordinary skill in the art will readily appreciate that the converted first image "A" 200 and the converted second image "B" 210 may be provided on a same side of the document 300.

FIG. 3 additionally illustrates an example in which light rays 345 transmitted through the filter layer 320 reveal images associated with the image elements provided out of alignment with the features 321 of the filter layer 320. The light rays 345 travel between the features 321 of the filter layer 320 and travel through the third image elements 309 of the first image layer 305 to reveal the converted third image "C" 220 when viewed from a perspective above the substrate 310 in FIG. 3. The light rays 345 transmitted through the filter layer 320 travel through the third image elements 309 of the first image layer 305 to reveal the flipped converted third image "C" 220' when viewed from a perspective below the substrate 310 in FIG. 3. According to one example, the transmitted image is variable. One of ordinary skill in the art will readily appreciate that the converted third image "C" 220 and the converted third image "C" 220' may be provided on different sides of the document 300. According to one example, when the light sources 420 impinge light rays on a single side of the document 300, the images revealed by the reflected light rays 340 or the transmitted light rays 345 are displayed separately. According to another example, when the light sources 420 concurrently impinge light rays on both sides document 300, the images revealed by the reflected light rays 340 may be displayed concurrently with the images revealed by transmitted light rays 345.

Figure 6:
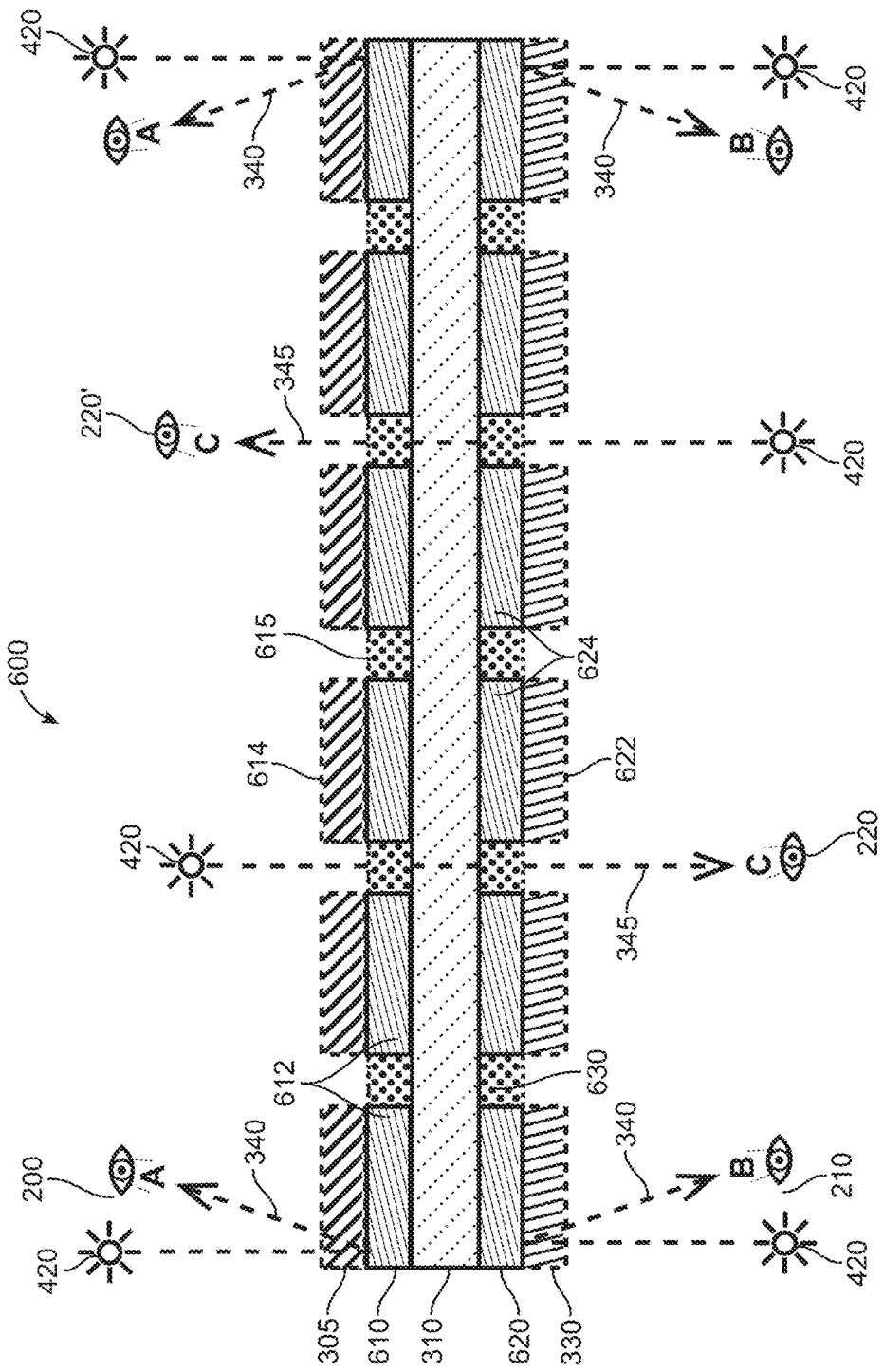
FIG. 6 illustrates a cross-sectional view of a document according to another example the disclosure.

FIG. 6 illustrates one example of a document 600 depicted in a cross-sectional view. The document 600 includes substrate 310 that may be transparent, translucent, semi-translucent, or a combination of these. The document 600 includes a first image layer 305 provided on a filter layer 610. The filter layer 610 may be provided on a first side of the substrate 310. The first image layer 305 may be deposited to substantially coincide with a geometry of an upper surface of the filter layer 610 such that the first image layer 305 is not deposited on side walls of the filter layer 610 nor on the substrate 310. The first image layer 305 includes first image elements 614 that are configured to render the converted first image "A" 200 in reflected light. According to one example, the first image elements 614 are provided on the filter layer 610 in alignment with the features 612 of the filter layer 610.

Third image elements 615 may be provided on the substrate 310 between the features 612 of the filter layer 610. In other words, the third image elements 615 may be provided out of alignment with the features 612 of the filter layer 610. The third image elements 615 may be configured to render the converted third image "C" 220 in transmitted light. According to one example, the converted first image "A" 200 and the converted third image "C" 220 are embedded within a same area of the substrate 310. In other words, the 2-D dot array that renders the converted first image "A" 200 is provided on a same area of the substrate 310 as the 2-D dot array that renders the converted third image "C" 220. This concept is illustrated with reference to FIGS. 4A, 4B, 5A, and 5B as described above.

The document 600 also includes a second filter layer 620 provided on a second side of the substrate 310, which is opposite to the first side of the substrate 310. According to one example, a second image layer 330 is provided on the second filter layer 620. The second image layer 330 may be provided to substantially coincide with a geometry of an upper surface of the second filter layer 620 such that the second image layer 330 is not deposited on side walls of the second filter layer 620 nor on the substrate 310. The second image layer 330 includes second image elements 622 that render the converted second image "B" 210 in reflected light. According to one example, the second image elements 622 are provided on the second filter layer 620 in alignment with the features 624 of the second filter layer 620.

Fourth image elements 630 may be provided on the substrate 310 between the features 624 of the second filter layer 620. In other words, the fourth image elements 630 may be provided out of alignment with the features 624 of the second filter layer 620. The fourth image elements 630 may be substantially identical to the third image elements 615. The fourth image elements 630 also may be configured to render the converted third image "C" 220 in transmitted light. According to one example, the converted first image "B" 210 and the converted third image "C" 220 are embedded within a same area of the substrate 310. In other words, the 2-D dot array that renders the converted first image "B" 210 is provided on a same area of the substrate 310 as the 2-D dot array that renders the converted third image "C" 220.

According to one example, the filter layer 610 and the second filter layer 620 may have substantially identical characteristics and may be substantially aligned relative to each other. One or both of the filter layer 610 and the second filter layer 620 may include a reflective filter screen, an opaque filter screen, or a combination of both. The filter layer 610 and the second filter layer 620 may be printed or imaged with light-shaded inks, reflective inks, dyes, toners, foils, or the like. The filter layer 610 and the second filter layer 620 may be printed or imaged using materials that include inverting transmission properties depending on whether the filter layer 610 and the second filter layer 620 are front-lit by reflected light rays or backlit by transmitted light rays. According to one example, images created using materials having inverting transmission properties appear as positive contrast in reflected light and negative contrast in transmitted light.

FIG. 6 further illustrates visual effects caused by light rays impinging on the document 600. For example, the light rays 340 reflected off the filter layer 610 reveal associated images with the image elements provided in alignment with the features 612 of the filter layer 610. The light rays 340 reflect off the filter layer 610 and travel through the first image elements 614 of the first image layer 305 to reveal the converted first image "A" 200 when viewed from a perspective above the substrate 310 in FIG. 6. In another example, the light rays 340 reflect off the second filter layer 620 and travel through the second image elements 622 of the second image layer 330 to reveal the converted second image "B" 210 when viewed from a perspective below the substrate 310 in FIG. 6. In this example, the converted first image "A" 200 and the converted second image "B" 210 are placed on opposite sides of the substrate 310. One of ordinary skill in the art will readily appreciate that the converted first image "A" 200 and the converted second image "B" 210 may be provided on a same side of the document 600.

FIG. 6 additionally illustrates an example in which light rays 345 transmitted through the filter layer 610 and the second filter layer 620 reveal images associated with the image elements provided out of alignment with features of the filter layer 610 and the second filter layer 620. The light rays 345 travel between the features 612 of the filter layer 610 and between the features 624 of the second filter layer 620. The light rays 345 transmit through the third image elements 615 of the first image layer 305 and the fourth image elements 630 of the second image layer 330 to reveal the converted third image "C" 220 when viewed from a perspective above the substrate 310 in FIG. 6. The light rays 345 transmit through the filter layer 610 and the second filter layer 620 in order to pass through the fourth image elements 620 of the second image layer 330 and the third image elements 615 of the first image layer 305 to reveal the flipped converted third image "C" 220' when viewed from a perspective below the substrate 310 in FIG. 6. One of ordinary skill in the art will readily appreciate that the converted third image "C" 220 and the converted third image "C" 220' may be provided on different sides of the document 600. According to one example, when the light sources 420 impinge light rays on a single side the document 600, the images revealed by the reflected light rays 340 or the transmitted light rays 345 are displayed separately. According to another example, when the light sources 420 concurrently impinge light rays on both sides document 600, the images revealed by the reflected light rays 340 may be displayed concurrently with the images revealed by transmitted light rays 345.

Figure 7:
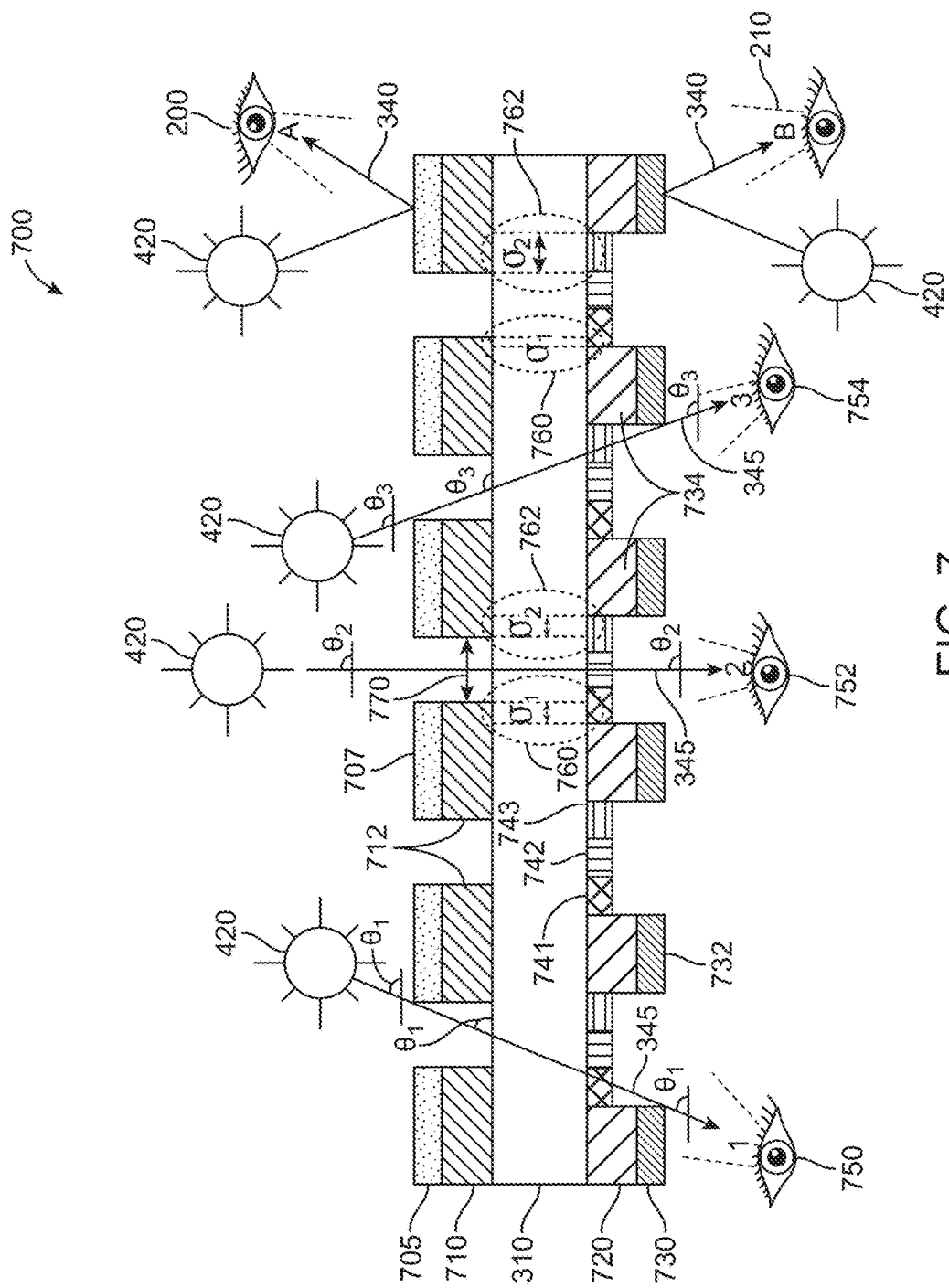
FIG. 7 illustrates a cross-sectional view of a document according to yet another example the disclosure.

FIG. 7 illustrates one example of a document 700 depicted in a cross-sectional view. The document 700 includes a substrate 310 that may be transparent, translucent, semi-translucent, or a combination of these. The document 700 includes a first image layer 705 deposited on a filter layer 710. The filter layer 710 may be provided on a first side of the substrate 310. The first image layer 705 may be deposited to substantially coincide with a geometry of an upper surface of the filter layer 710 such that the first image layer 705 is not deposited on side walls of the filter layer 710 nor on the substrate 310. The first image layer 705 includes first image elements 707 that are configured to render the converted first image "A" 200 in reflected light. According to one example, the first image elements 707 are provided on the filter layer 710 in alignment with the features 712 of the filter layer 710.

The document 700 also includes a second filter layer 720 deposited on a second side of the substrate 310, which is opposite to the first side of the substrate 310. According to one example, a second image layer 730 may be deposited on the second filter layer 720. The second image layer 730 may be provided to substantially coincide with a geometry of an upper surface of the second filter layer 720 such that the second image layer 730 is not deposited on side walls of the second filter layer 720 nor on the substrate 310. The second image layer 730 includes second image elements 732 that render the converted second image "B" 210 in reflected light. According to one example, the second image elements 732 are deposited on the second filter layer 720 in alignment with the features 734 of the second filter layer 720.

A plurality of separate image elements may be provided on the substrate 310 between the features 734 of the second filter layer 720. In other words, the plurality of separate image elements may be provided out of alignment with the features 734 of the second filter layer 720. According to one example, the plurality of separate image elements may be selectively aligned with corresponding image elements to be collectively rendered at specific light ray entry angles. Each of the plurality of separate image elements may render a distinct image when the document 700 is re-oriented to change a light ray entry angle. According to one example, the document 700 is oriented to form a first entry angle $\theta_1$ to render a converted third image "1" 750 when the light rays 345 are transmitted through the third image elements 741. According to another example, the document 700 is oriented to form a second entry angle $\theta_2$ in order to render a converted fourth image "2" 752 when the light rays 345 are transmitted through the fourth image elements 742. According to yet another example, the document 700 is oriented to form a third entry angle $\theta_3$ in order to render a converted third image "3" 754 when the light rays 345 are transmitted through the fifth image elements 743.

According to one example, the converted third image "1" 750, the converted fourth image "2" 752, and the converted fifth image "3" 754 are embedded within a same area of the substrate 310. In other words, the 2-D dot array that renders the converted third image "1" 750 is provided on a same area of the substrate 310 as the 2-D dot array that renders the converted fourth image "2" 752, which is rendered on a same area of the substrate 310 as the 2-D dot array that renders the converted fifth image "3" 754. This concept is generally described above with reference to FIGS. 4A, 4B, 5A, and 5B.

According to one example, the plurality of entry angles may be pre-set by positioning the features 712 of the filter layer 710 relative to the features 734 of the second filter layer 720. In this example, the features 712 of the filter layer 710 are not aligned with respect to the features 734 of the second filter layer 720. In other words, the first filter layer 710 and the second filter layer 720 are positioned relative to each other to selectively obstruct transmitted light at certain angles of view. A first offset $\sigma_1$ may be set between a right-side portion of feature 712 of the filter layer 710 and a right-side portion of feature 734 of the second filter layer 720 as illustrated in area 760. A second offset $\sigma_2$ may be determined between a left-side portion of feature 712 of the filter layer 710 and a left-side portion of feature 734 of the second filter layer 720. As illustrated in FIG. 7, selection of the first offset $\sigma_1$ and selection of the second offset $\sigma_2$ establish the first entry angle $\theta_1$ and the third entry angle $\theta_3$. As illustrated in FIG. 7, a gap width 770 is selected between the feature 712 of the filter layer 710 so that the light rays 345 illuminate the converted fourth image "2" 752 when the second entry angle $\theta_2$ is approximately 90°.

FIG. 7 further illustrates visual effects caused by light rays impinging on the document 700 at different entry angles. The light rays 345 travel between the features 712 of the filter layer 710 and between the features 734 of the second filter layer 720. According to one example, the light rays 345 enter the document 700 at the first entry angle $\theta_1$ and are transmitted through the filter layer 710 and the second filter layer 720 to reveal the converted third image "1" 750 when viewed from a perspective below the substrate 310. According to another example, the light rays 345 enter the document 700 at the second entry angle $\theta_2$ and are transmitted through the filter layer 710 and the second filter layer 720 to reveal the converted fourth image "2" 752 when viewed from a perspective below the substrate 310. According to yet another example, the light rays 345 enter the document 700 at the third entry angle $\theta_3$ and are transmitted through the filter layer 710 and the second filter layer 720 to reveal the converted fifth image "3" 754 when viewed from a perspective below the substrate 310. Accordingly, images "1", "2", or "3" are viewable in transmitted lighting conditions depending on the viewer's angle of view. One of ordinary skill in the art will readily appreciate that the converted third image "1" 750, the converted fourth image "2" 752, and the converted fifth image "1" 754 may be provided on the upper side of the substrate 310. One of ordinary skill in the art will also readily appreciate that the third image elements 741, the fourth image elements 742, and the fifth image elements 743 may be provided in any order on the substrate 310. In FIG. 7, at least one image is viewable on each side of the document 700 under reflective lighting conditions and multiple images are viewable under transmitted lighting conditions. One of ordinary skill in the art will further readily appreciate that any number of separate image elements may be supported.

FIG. 7 also illustrates that the light rays 340 reflected off the filter layer 710 reveal images associated with the image elements provided in alignment with the features 712 of the filter layer 710. For example, the light rays 340 reflect off the filter layer 710 and travel through the first image elements 707 of the first image layer 705 to reveal the converted first image "A" 200 when viewed from a perspective above the substrate 310 in FIG. 7. In another example, the light rays 340 reflect off the second filter layer 720 and travel through the second image elements 732 of the second image layer 730 to reveal the converted second image "B" 210 when viewed from a perspective below the substrate 310 in FIG. 7. In this example, the converted first image "A" 200 and the converted second image "B" 210 are placed on opposite sides of the substrate 310. One of ordinary skill in the art will readily appreciate that the converted first image "A" 200 and the converted second image "B" 210 may be provided on a same side of the document 700.

According to one example, when the light rays from the light sources 420 impinge on a single side the document 700, the images revealed by the reflected light rays 340 or the transmitted light rays 345 are displayed separately. According to another example, when the light sources 420 concurrently impinge light rays on both sides document 700, the images revealed by the reflected light rays 340 may be displayed concurrently with the images revealed by transmitted light rays 345.

According to one example, multiple reflected images may be generated on a single side of the substrate 310 by printing a plurality of stacked light transmitting image layers on one or more filter layers. The additional light transmitting image layers may become translucent or transparent when viewed at certain angles. Alternatively, the additional light transmitting image layers may become visible when viewed at certain angles.

According to one example, reflective filter layers may be positioned so that different light transmitting images are rendered at different angles. For example, the reflective screens may be positioned relative to each other to render different images at different angles. For example, the reflective pattern may include light transmitting areas that are small, thin, elongated, and may be aligned at specific angles to create latent images when the optical device is positioned at a desired angle. When the optical device is positioned between a light source and a viewer such that the optical device is not perpendicular to the viewer's line of sight, light rays may be transmitted through portions of the screen in which the thin, elongated "holes" in the reflective screen are parallel to the viewer's line of sight. In this case, the light rays may be blocked by portions of the screen in which the thin, elongated "holes" are perpendicular to the viewer's line of sight. Therefore, the filter screen can be designed so that when viewed at an angle, a portion of the light transmitting image may be viewable and the other portion will not.

Another technique for creating additional images in reflected light is to align the reflective screens so that light rays impinge the optical device at angles that are not perpendicular to a cross section of the optical device. For example, selected elements may be illuminated when the optical device is viewed at certain angles.

According to another example, the filter layers may be constructed of a material that both reflects light rays and creates an image. For example, the material may include a holographic foil. In this case, the light transmitting image layers may be omitted all together. A holographic foil creates more than one image when viewed at different angles under reflected lighting conditions. According to one example, placing a holographic foil a single side of the substrate 310 may generate multiple reflected images.

Figure 8A:
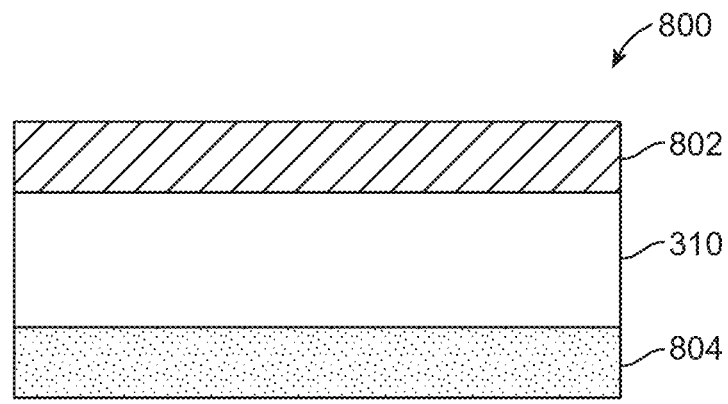
FIGS. 8A-8C illustrate cross-sectional views of various documents according to another example the disclosure.
Figure 8B:
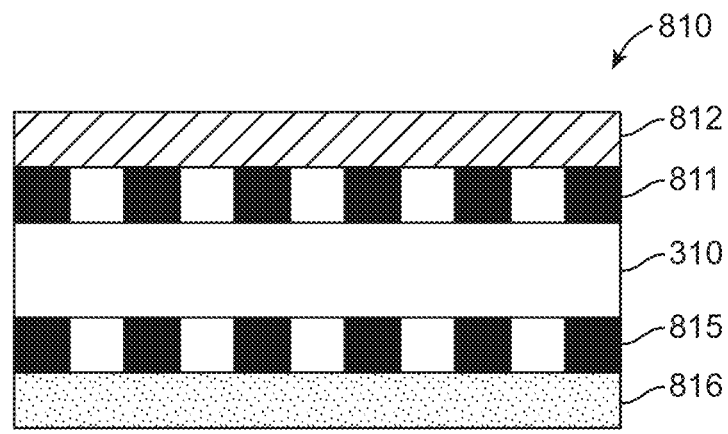
Figure 8C:
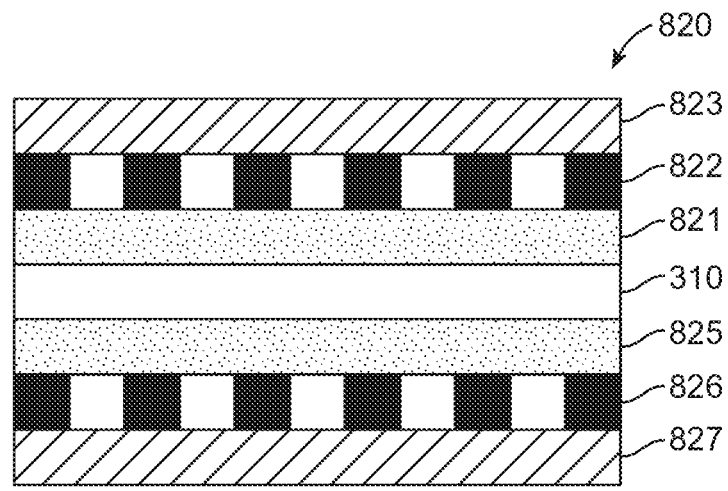

FIGS. 8A-8C illustrate examples of documents that include both a grayscale image layer and a color image layer corresponding to a same substrate. For example, the grayscale image layer renders a black and white image when the document is viewed in reflective lighting conditions. The color image layer renders a color image when the document is viewed in transmitted lighting conditions. The color image layer may be configured to exclude black elements. According to one example, the black and white image and the color image may correspond to a same image. In other words, the black and white image viewed in reflected light may be converted to a color image by transitioning the document from the reflected lighting conditions to transmitted lighting conditions.

FIG. 8A illustrates one example of a document 800 depicted in a cross-sectional view. The document 800 includes a grayscale image layer 802 provided on a first side of the substrate 310 and a color image layer 804 provided on a second side of the substrate 310. The substrate 310 may be transparent, translucent, semi-translucent, or a combination of these. According to one example, the grayscale image layer 802 renders a black and white image under appropriate lighting conditions. The color image layer 804 renders a color image under appropriate lighting conditions. According to one example, the document 800 renders a black and white image on the first side in reflected light, a corresponding color image without black shading on the second side in reflected light, and a full color, black shaded, corresponding image when light rays are transmitted through the document 800. According to one example, the black and white image and the color image may correspond to a same image and may be aligned and scaled accordingly. Alternatively, the black and white images and the color images may correspond to different images.

FIG. 8B illustrates one example of a document 810 depicted in a cross-sectional view. The document 810 includes a filter layer 811 provided on the substrate 310 and a grayscale image layer 812 provided on the filter layer 811. The document 810 further includes a second filter layer 815 provided on a second side of the substrate 310 and a color image layer 816 provided on the second filter layer 815. The substrate 310 may be transparent, translucent, semi-translucent, or a combination of these. According to one example, the grayscale image layer 812 renders a black and white image under appropriate lighting conditions. The color image layer 816 renders a color image under appropriate lighting conditions. According to one example, the document 810 renders a black and white image on the first side in reflected light, a corresponding color image without black shading on the second side in reflected light, and a full color, black shaded, corresponding image when light rays are transmitted through the document 810. According to one example, the black and white image and the color image may correspond to a same image. Alternatively, the black and white images and the color images may correspond to different images.

FIG. 8C illustrates one example of a document 820 depicted in a cross-sectional view. The document 820 includes a color image layer 821 provided on the substrate 310, a filter layer 822 provided on the color image layer 821, and a grayscale image layer 823 provided on the filter layer 822. The document 820 further includes a second color image layer 825 provided on the substrate 310, a second filter layer 826 provided on the second color image layer 825, and a second grayscale image layer 827 provided on the second filter layer 826. The substrate 310 may be transparent, translucent, semi-translucent, or a combination of these. According to one example, the grayscale image layer 823 and the second grayscale image layer 827 each render a black and white image under appropriate lighting conditions. The color image layer 821 and the second color image layer 825 each render a color image under appropriate lighting conditions. According to one example, the document 820 renders a black and white image on both sides in reflective lighting conditions and a full color, black shaded, corresponding image when light rays are transmitted through the document 820. According to one example, the black and white images and the color images may correspond to a same image. Alternatively, the black and white images and the color images may correspond to different images.

Figure 9B:
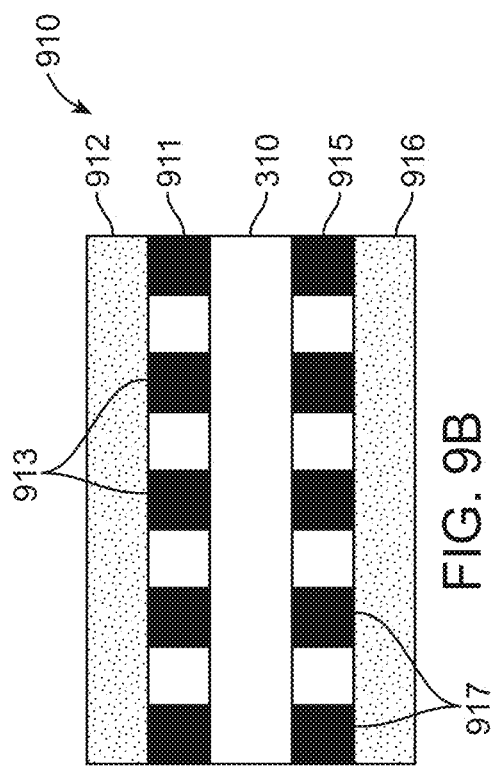
FIGS. 9A-9C illustrate cross-sectional views of various documents according to another example the disclosure.
Figure 9A:
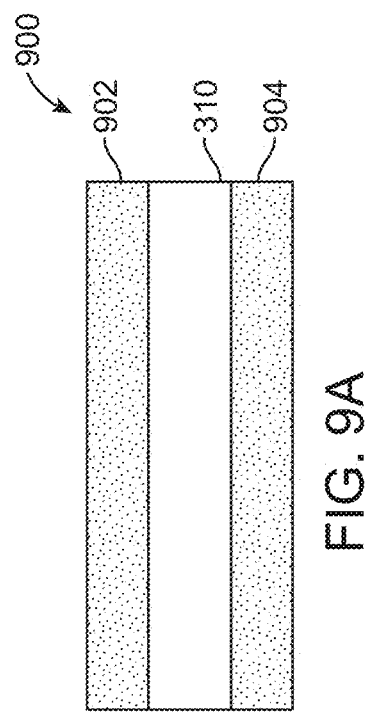
Figure 9C:
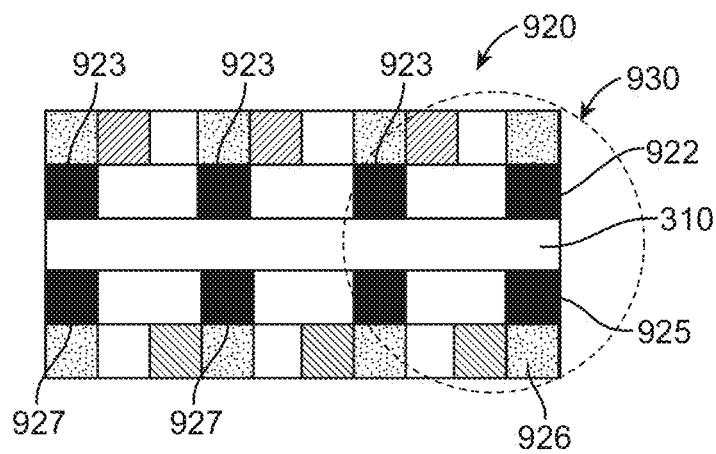

FIGS. 9A-9C illustrate examples of documents that include a plurality of color image layers corresponding to a same substrate. The color image layers render a color image when the document is viewed in reflected and transmitted light. The color image layers may be configured to exclude black elements. According to one example, a first color image layer may render a first partial color image when viewed in reflected light. A second color image layer may render a second partial color image when viewed in reflected light. When viewed in transmitted light, the first partial color image and the second partial color image render a complete color image.

FIG. 9A illustrates one example of a document 900 depicted in a cross-sectional view. The document 900 includes a first color image layer 902 provided on a first side of the substrate 310 and a second color image layer 904 provided on a second side of the substrate 310. According to one example, the first color image layer 902 may include two color elements, such as cyan and black elements. The second color image layer 904 also may include two color elements, such as magenta and yellow elements. One of ordinary skill in the art will readily appreciate that the color image layers are not limited to any specific number of colors and may support a plurality of different color elements. The substrate 310 may be transparent, translucent, semi-translucent, or a combination of these. According to one example, the first color image layer 902 renders a first partial color image on a first side of the substrate 310 under reflective lighting conditions. The second color image layer 904 renders a second partial color image on a second side of the substrate 310 under reflective lighting conditions. According to one example, a complete color image may be rendered when light rays are transmitted through the document 900. According to one example, the first partial image and the second partial image may correspond to a same image. This concept is illustrated with reference to FIGS. 10A-10C.

Figure 10A:
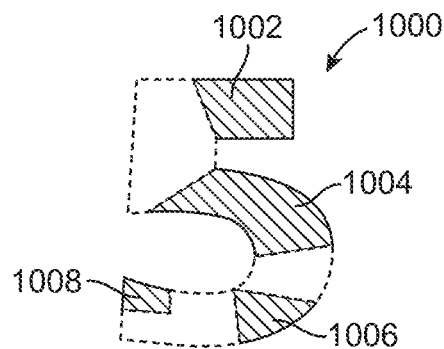
FIGS. 10A-10C illustrate partial color images and a complete color image of a multi-image watermark according to one example of the disclosure.

FIG. 10A illustrates an example of the first partial color image 1000 rendered by the first color image layer 902 under reflected light. The first partial color image 1000 includes a first partial color portion 1002, a second partial color portion 1004, a third partial color portion 1006, and a fourth partial color portion 1008. According to one example, the portions corresponding to the first partial color image 1000 may be rendered using the color elements associated with the first color image layer 902. FIG. 10A includes dashed lines to assist with visualizing that the complete color image is a number "5" as illustrated in FIG. 10C. According to one example, the dashed lines may not appear as part of the rendered first partial color image.

Figure 10B:
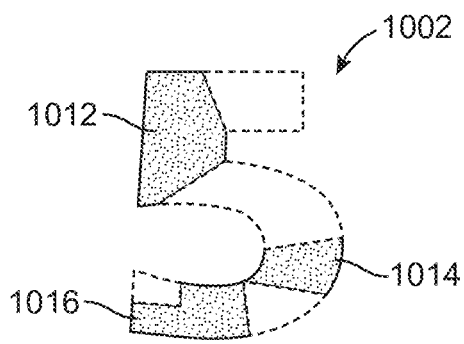
Figure 10C:
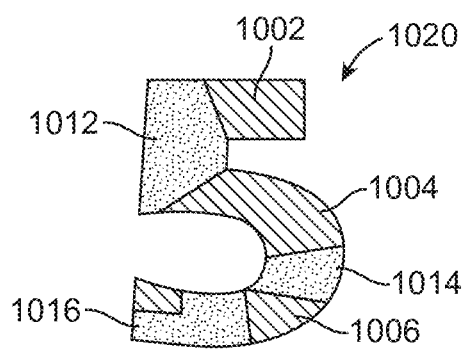

FIG. 10B illustrates an example of the second partial color image 1010 rendered by the second color image layer 904 under reflected light. The second partial color image 1010 includes a fifth partial color portion 1012, a sixth partial color portion 1014, and a seventh partial color portion 1016. According to one example, the portions corresponding to the second partial color image 1010 may be rendered using the color elements associated with the second color image layer 904. FIG. 10B includes dashed lines to assist with visualizing that the complete color image is a number "5" as illustrated in FIG. 10C. According to one example, the dashed lines may not appear as part of the rendered second partial color image.

FIG. 10C illustrates an example of the complete color image 1020 that includes both the first partial color image 1000 and the second partial color image 1010 rendered by both the first color image layer 902 and the second color image layer 904 under transmitted lighting conditions. The complete color image 1020 includes the partial color image portions contributed by the first partial color image 1000 and the second partial color image 1010. Specifically, the complete color image 1020 includes the first partial color portion 1002, the second partial color portion 1004, the third partial color portion 1006, the fourth partial color portion 1008, the fifth partial color portion 1012, the sixth partial color portion 1014, and the seventh partial color portion 1016. According to one example, the complete color image 1020 may be rendered using the first partial color image 1000 and the second partial color image 1010 having color elements associated with the first color image layer 902 and the second color image layer 904, respectively. One of ordinary skill in the art will readily appreciate that three or more color image layers may be used to generate a complete color image.

FIG. 9B illustrates one example of a document 910 depicted in a cross-sectional view. The document 910 includes a first color image layer 912 provided on a first filter layer 911. The first filter layer 911 may be provided on a first side of the substrate 310. According to one example, the first filter layer 911 may include features 913 that correspond to a first image rendered on the first side. The document 910 also includes a second filter layer 915 provided on a second side of the substrate 310, which is opposite to the first side of the substrate 310. According to one example, the second filter layer 915 may include features 917 that correspond to a second image rendered on the second side. According to one example, a second color image layer 916 may be provided on the second filter layer 915.

According to one example, the first color image layer 912 may include two color elements, such as cyan and black elements. The second color image layer 916 also may include two color elements, such as magenta and yellow elements. One of ordinary skill in the art will readily appreciate that the color image layers are not limited to any specific number of colors and may support a plurality of different color elements. The substrate 310 may be transparent, translucent, semi-translucent, or a combination of these. According to one example, the first color image layer 912 may render a first partial color image on a first side of the substrate 310 under reflective lighting conditions. Additionally, the first filter layer 911 may render a first partial grayscale image on the first side of the substrate 310 under reflective lighting conditions. The second color image layer 916 may render a second partial color image on a second side of the substrate 310 under reflective lighting conditions. Additionally, the second filter layer 915 may render a second partial grayscale image on the second side of the substrate 310 under reflective lighting conditions. According to one example, a complete color image may be rendered when light rays are transmitted through the document 910. According to one example, the first partial image and the second partial image may correspond to a same image. This concept is illustrated with reference to FIGS. 10A-10C.

FIG. 9C illustrates one example of a document 920 depicted in a cross-sectional view. The document 920 includes a first color image layer 922 provided on a first filter layer 921. The first filter layer 921 may be provided on a first side of the substrate 310. The substrate 310 may be transparent, translucent, semi-translucent, or a combination of these. According to one example, the first filter layer 921 may include features 923 that correspond to a first image rendered on the first side. The document 920 also includes a second filter layer 925 provided on a second side of the substrate 310, which is opposite to the first side of the substrate 310. According to one example, the second filter layer 925 may include features 927 that correspond to a second image rendered on the second side. According to one example, a second color image layer 926 may be provided on the second filter layer 925. According to one example, the first filter layer 921 and the second filter layer 925 may be substantially aligned relative to each other. According to one example, the first color image layer 922 may include two color elements, such as cyan and black elements. The second color image layer 926 also may include two color elements, such as magenta and yellow elements. One of ordinary skill in the art will readily appreciate that the color image layers are not limited to any specific number of colors and may support a plurality of different color elements.

Figure 9D:
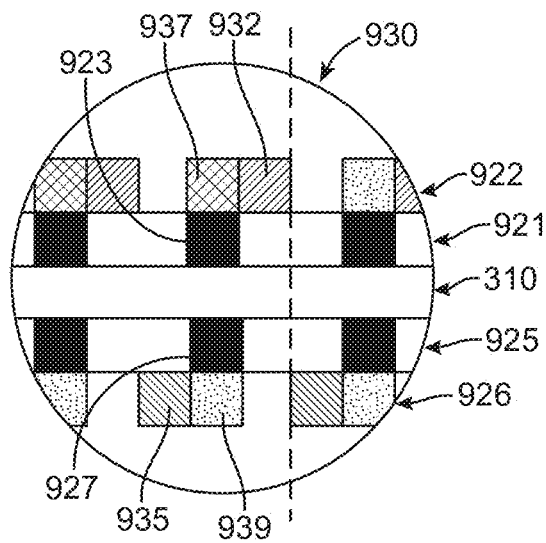
FIG. 9D illustrates a magnified view of a portion of FIG. 9C according to another example the disclosure.

FIG. 9D illustrates a magnified area 930 of the document 920. According to one example, the first color image layer 922 may include a plurality of separate partial color image elements provided on the first filter layer 921. The second color image layer 926 may include a plurality of separate partial color image elements provided on the second filter layer 925. According to one example, the plurality of separate partial color image elements provided on the first color image layer 922 and the second color image layer 926 may be laterally offset relative to each other. For example, first partial color image elements 932 provided on the first color image layer 922 may be offset to a right side of the feature 923. Second partial color image elements 935 provided on the second color image layer 926 may be offset to a left side of the feature 927.

Each of the separate partial color image elements may render a distinct partial color image on a corresponding side when the document 920 is viewed under reflective light conditions. Accordingly, the first partial color elements 932 may render a first partial color image on a first side of the document 920 under reflective lighting conditions. The second partial color elements 935 may render a second partial color image on a second side of the document 920 under reflective lighting conditions. Furthermore, since the first filter layer 921 and the second filter layer 925 are substantially vertically aligned relative to each other, the relative offsets may be known and introduced between the partial color image elements to render a complete color image when the document 920 is viewed under transmitted light conditions. According to one example, the first partial color image and the second partial color image may correspond to a same image. This concept is illustrated with reference to FIGS. 10A-10C.

Additionally, the features 923 provided on the first filter layer 921 may render a first partial grayscale image on the first side of the document 920 under reflective lighting conditions. Rendering the first partial grayscale image may interfere with rendering the first partial color image since both images may be revealed under reflective lighting conditions. To avoid rendering the first partial grayscale image under reflective lighting conditions, first filler color image elements 937 may be deposited on the first color image layer 922 to substantially coincide with the features 923 of the first filter layer 921. In this way, only the partial first color image may be revealed under reflective lighting conditions.

The features 927 provided on the second filter layer 925 may render a second partial grayscale image on the second side of the document 920 under reflective lighting conditions. Rendering the second partial grayscale image may interfere with rendering the second partial color image since both images may be revealed under reflective lighting conditions. To avoid rendering the second partial grayscale image under reflective lighting conditions, second filler color image elements 937 may be deposited on the second color image layer 922 to substantially coincide with the features 927 of the second filter layer 925. In this way, only the partial second color image may be revealed under reflective lighting conditions.

In another example, the first filler color image elements 937 may be embedded with the first partial color image elements 932 to conceal the first partial color image. For example, the first filler color image may be configured to conceal the first partial color image under normal lighting conditions. The first partial color image may be revealed under reflective lighting conditions, transmitted lighting conditions, or both. In another example, the second filler color image elements 939 may be embedded with the second partial color image elements 935 to conceal second first partial color image. For example, the second filler color image may be configured to conceal the second partial color image under normal lighting conditions. The second partial color image may be revealed under reflective lighting conditions, transmitted lighting conditions, or both.

Referring back to FIG. 3, one application provides a document 300 that includes the substrate 310 having the dynamic filter layer 320 and the first image layer 305 with a static color pattern. As described below with reference to FIGS. 11-14, the dynamic filter layer 320 enables the document 300 to render different color images using the static color pattern provided on the first image layer 305.

FIG. 11A illustrates one example color image layer 305. The color image layer 305 also represents one example of the color image layers described with respect to FIGS. 8A-8C and 9A-9C. The color image layer 305 includes a static pattern of repeating color elements or cells. The pattern of color cells may be selected to render a spectrum of colors. For example, the pattern of repeating color cells may include red, green, blue ("RGB") color cells. If a color purple is desired in a particular area having the RGB pattern of color cells, the green cell may be blocked leaving only the red and blue cells. If a desired shade of purple is desired, the green cell may be blocked and a selected percentage of the red and blue cells may be blocked. One of ordinary skill in the art will readily appreciate that any number of different color patterns may be used. For example, another color pattern includes cyan, magenta, and yellow ("CMY").

FIG. 11B illustrates a magnified area 1105 of the color image layer 305 showing that the static pattern includes three repeating color cells 1107, 1108, and 1109. While the color cells are depicted as hexagons, the color cells may include any shape, such as dots, triangles, squares, pentagons, hexagons, lines, or any other shape. One of ordinary skill in the art will readily appreciate that the static pattern may include a greater number or a lesser number of repeating colors. The color image layer 305 may be printed on the substrate 310 such that the pattern of repeating color cells is deposited in a single layer. In other words, unlike traditional printing in which each color is printed in a separate layer, this example prints each color in a same layer.

Figures 12A, 12B:
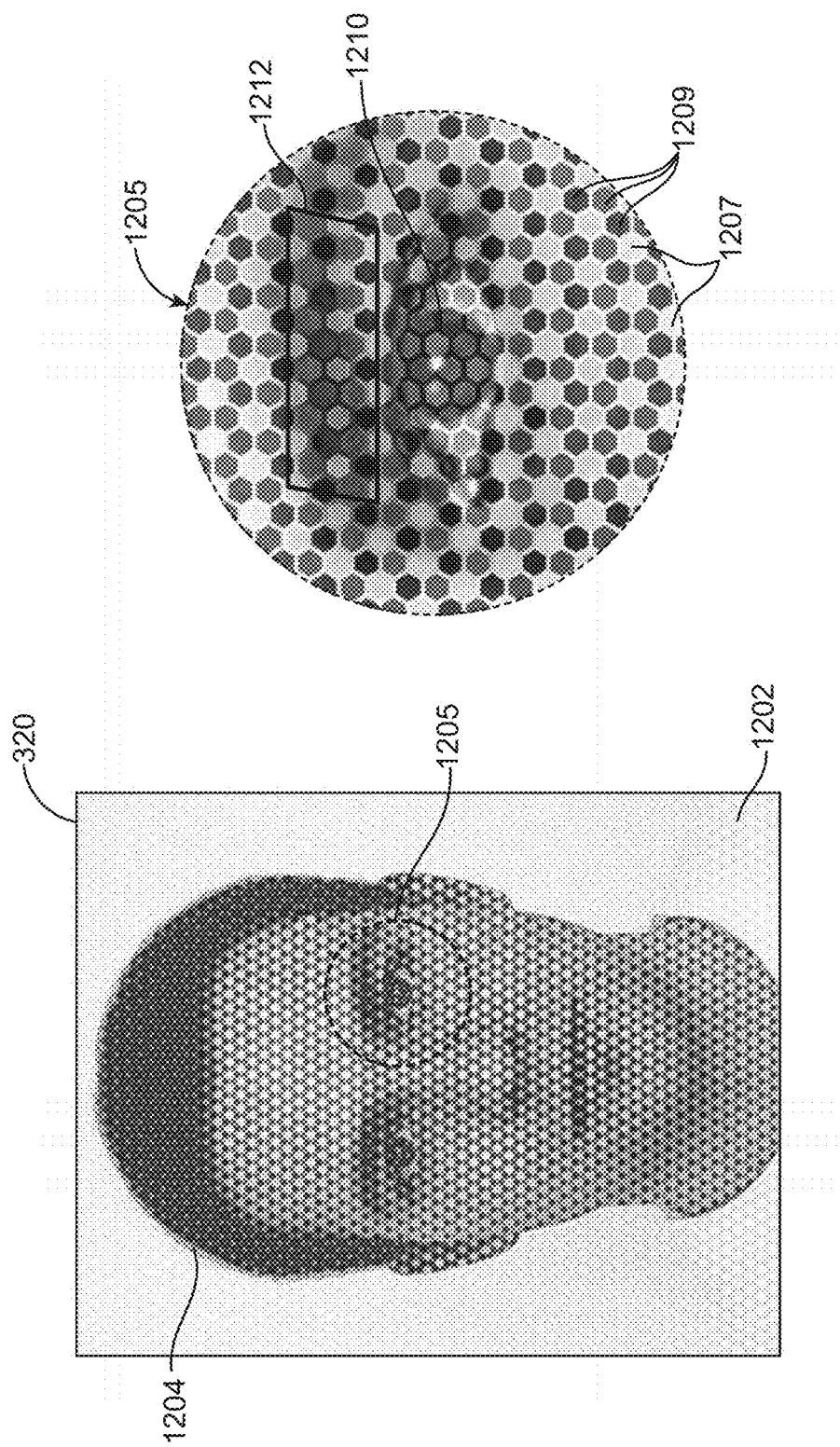
FIG. 12A illustrates a dynamic filter layer according to one example of the disclosure.
FIG. 12B illustrates a magnified view of a portion of FIG. 12A according to one example of the disclosure.

FIG. 12A illustrates one example of the dynamic filter layer 320 having translucent portions 1202 represented by white areas and transparent portions 1204 represented by black areas. According to one example, selected areas of the dynamic filter layer 320 are converted from the transparent portions 1204 to translucent portions 1202 in order to block light rays from transmitting through the dynamic filter layer 320. In other words, the dynamic filter layer 320 is deposited on the substrate 310 having only transparent portions 1204 and one or more techniques are applied to obtain selected translucent portions 1202. For example, the translucent portions 1202 may be created using laser engraving or ablation, perforation, printing with opaque inks, or the like.

FIG. 12B illustrates a magnified area 1205 of the dynamic filter layer 320 that corresponds to the image of the eye. According to one example, a transparent cell 1209 pattern provided on the dynamic filter layer 320 is aligned with selected color cells provided in the pattern of repeating color cells 1107, 1108, and 1109 provided on the color image layer 305 illustrated in FIG. 11A. While the transparent cells 1209 are depicted as hexagons, the transparent cells 1209 may include any shape, such as dots, triangles, squares, pentagons, hexagons, lines, or any other shape. The transparent cells 1209 may have varying levels of color density or transparency. For example, dark colored transparent cells 1209 may be fully transparent, while light colored transparent cells 1209 may be partially transparent. Additionally, color density within each transparent cell 1209 may vary. According to one example, the generally circular center region 1210 defines an eye and includes both light colored and dark colored transparent cells 1209. These varying levels of color density in the circular region 1210 support blending of colors to render an eye color of blue, green, hazel, or brown, among other colors. According to another example, the enclosed region 1212 defines an eye brow and includes both light colored and dark colored transparent cells 1209. These varying levels of color density in the enclosed region 1212 also support blending of colors to render an eye brow color of blonde, brown, auburn, or black, among other colors.

The opaque cells 1207 correspond to translucent portions 1202 of the dynamic filter layer 320 and are depicted as being larger in size than the corresponding repeating color cells 1107, 1108, and 1109 illustrated in FIG. 11B. The opaque cells 1207 block light transmitting through the dynamic filter layer 320. The larger sized opaque cells 1207 facilitate placement and positioning over the smaller sized repeating color cells 1107, 1108, and 1109 illustrated in FIG. 11B. According to another example the opaque cells 1207 may be of the same size as the repeating color cells 1107, 1108, and 1109 illustrated in FIG. 11B. The region of the magnified area 1205 outside the circular region 1210 and the enclosed region 1212 defines a skin color and, as expected, includes a large number of opaque cells 1207 and only a few light colored and dark colored transparent cells 1209. The dynamic filter image layer 320 may render a grayscale image of the portrait under reflective lighting conditions.

Figures 13A, 13B:
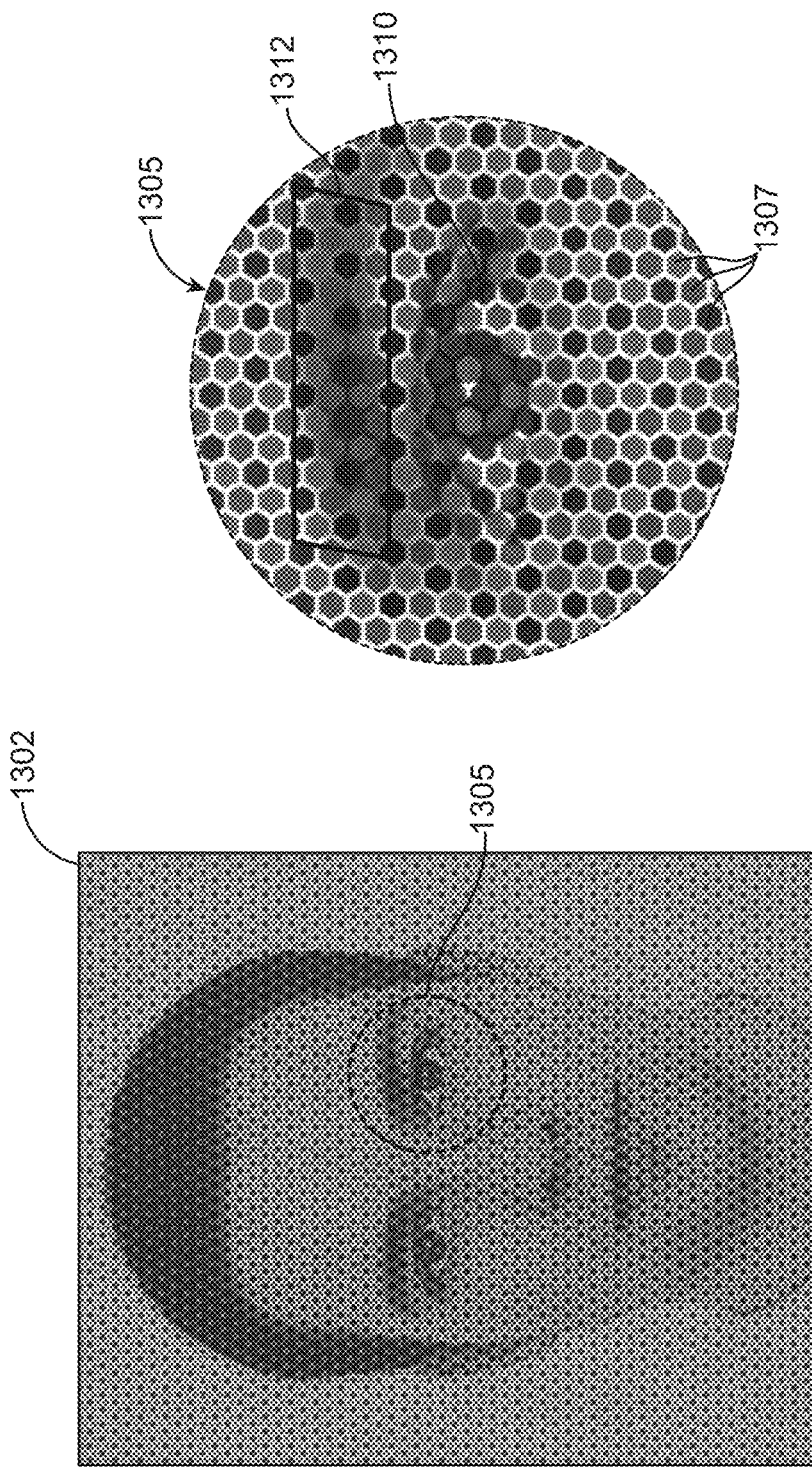
FIG. 13A illustrates a color image according to one example of the disclosure, the color image corresponding to the color image layer illustrated in FIG. 11A and the dynamic filter layer illustrated in FIG. 12A.
FIG. 13B illustrates a magnified view of a portion of FIG. 13A according to one example of the disclosure.

FIG. 13A illustrates one example of a color image 1302 rendered using light transmitted through the dynamic filter layer 320 of the document 300. FIG. 13B illustrates a magnified area 1305 of the rendered color image 1302 that corresponds to the magnified area 1205 of the dynamic filter layer 320 depicted in FIG. 12B, which corresponds to the image of the eye. The rendered color image 1302 corresponds to the grayscale image from the dynamic filter layer 320. While the image cells 1307 are depicted as hexagons, the image cells 1307 may include any shape, such as dots, triangles, squares, pentagons, hexagons, lines, or any other shape. The image cells 1307 emit varying color shades and intensity levels depending on a transparency of the cells of the dynamic filter layer 320. For example, the color shades and intensity levels that correspond to the dark colored transparent cells 1209 of the dynamic filter layer 320 are bright, while the color shades and intensity levels that correspond to the light colored transparent cells 1209 are relatively less bright. In this way, the color shades and intensity levels of the image cells 1307 may vary depending on the color density within the corresponding transparent cells 1209 of the dynamic filter layer 320. According to one example, the generally circular center region 1310 defines an eye and emits a color and intensity level corresponding to both the light colored and dark colored transparent cells 1209 of the dynamic filter layer 320. These color and intensity level rendered for the eye color include blue, green, hazel, or brown, among other colors. According to another example, the enclosed region 1312 defines an eye brow and emits a color and intensity level corresponding to both the light colored and dark colored transparent cells 1209 of the dynamic filter layer 320. The color and intensity level rendered for the eye brow color include blonde, brown, auburn, or black, among other colors.

Figure 14:
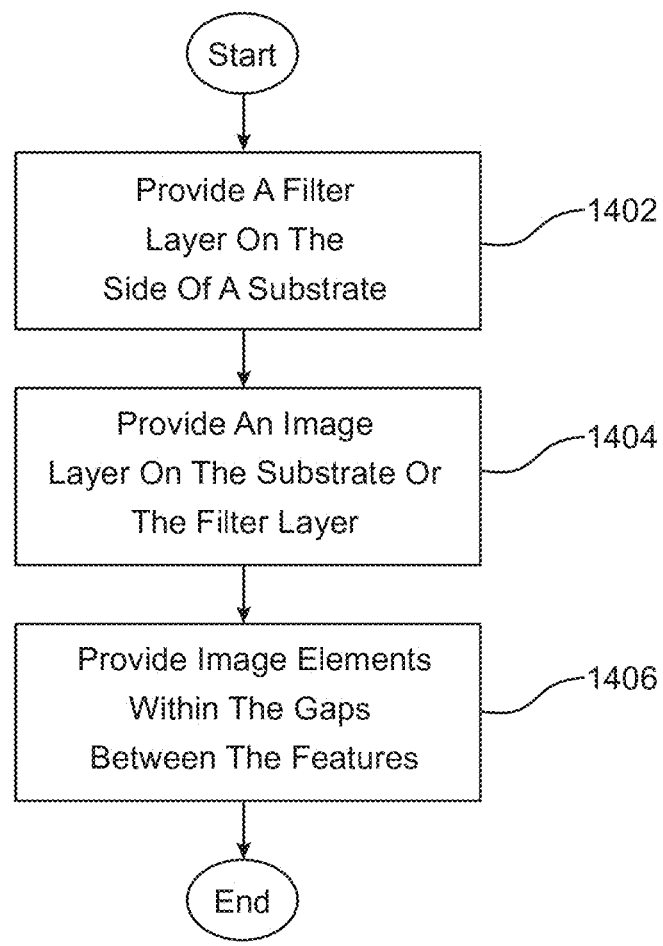
FIG. 14 illustrates an example process of forming an optical device according to one example of the disclosure.

FIG. 14 illustrates an example process of constructing an optical device having a substrate. The method includes providing a filter layer on the substrate in operation 1402, the filter layer including features that render a first image and gaps between the features. In operation 1404, an image layer 1404 is provided on the substrate or the filter layer. In operation 1406, image elements may be provided within the gaps between the features. Additionally, second image elements may be provided on the filter layer in substantial alignment with the features of the filter layer. According to one example, the image elements and the second image elements may be deposited in a same area of the substrate, such that the image elements and the second image elements are embedded together. According to one example, the filter layer renders the first image in reflective light and the image elements render a second image in transmitted light. According to another example, third image elements are deposited on a second side of the substrate opposite the first side in substantial alignment with the features of the filter layer such that the third image elements render the third image in reflective light.

Another example process may be provided to render the image 1302 on the document 300 using the dynamic filter layer 320 and first image layer 305 having the static color pattern. According to one example, the document 300 may include two or more sheets of polycarbonate substrate having opaque characteristics. a pattern of repeating color cells, such as RGB color cells, may be printed on a first sheet of polycarbonate substrate. A second sheet of polycarbonate substrate may be placed on the first sheet of polycarbonate substrate and the sheets may be heated and pressed together. The application of heat and pressure fuses the sheets of polycarbonate substrate and alters characteristics of the polycarbonate substrate from opaque to transparent. Next, the fused sheets of polycarbonate substrate may be laser engraved. The laser beam is configured to burn a surface of the polycarbonate substrate in order to alter characteristics of a polycarbonate substrate from transparent to translucent or opaque. According to one example, a resolution of the laser beam is selected such that the laser may burn from 0.1-100% of an area covered by each color cell. According to one example, the laser beam may dynamically generate the filter layer 320 as a halftone screen filter by burning 50% of the area covered by selected color cell. Alternatively, the laser beam may dynamically generate the filter layer 320 to produce shades of a desired color by burning the percentage of the area covered by selected RGB color cells. FIG. 12A illustrates an example of the dynamic filter layer 320 that is processed to render a photographic image of a subject. In this way, different images may be rendered from a plurality of documents 300, each document 300 having a same static color image layer 320 and a different corresponding dynamic filter layer 320. By way of comparison, this process of maintaining a static color layer differs from conventional printing processes that alter properties of color elements to render different images.

One of ordinary skill in the art will readily appreciate that various modification can be made without departing from the spirit of the invention. While the foregoing written description of the invention enables one of ordinary skill to make and use the disclosed embodiments, those of ordinary skill will understand and appreciate the existence of variations, combinations, and equivalents of the specific embodiment, method, and examples herein. The invention should therefore not be limited by the above described embodiments, methods, and examples. The invention is only limited by the appended claims.

I claim:

1. An optical device, comprising:
a substrate;
a filter layer provided on the substrate, the filter layer including features that reflect light rays that impinge thereon to render a first image and gaps between the features; and
an image layer provided on at least one of the substrate and the filter layer, the image layer allowing light rays to travel therethrough, the image layer including:
first image elements being vertically aligned with the features of the filter layer to render the first image in reflected light; and
second image elements provided within the gaps between the features, the second image elements being provided out of vertical alignment with the features of the filter layer, the second image elements being laterally offset from the first image elements so that light transmitted through the gaps travels through the second image elements and does not travel through the first image elements,
the second image elements rendering a second image in transmitted light at a first side of the substrate and a third image in transmitted light at a second side of the substrate, the third image being a flipped version of the second image, wherein the second side of the substrate is opposite to the first side of the substrate.

2. The optical device according to claim 1, wherein the filter layer includes at least one of a reflective surface and an opaque surface.

3. The optical device according to claim 1, further comprising a second image layer provided on the other of the substrate or the filter layer, the second image layer allowing light rays to travel therethrough, the second image layer including third image elements provided in vertical alignment with the features of the filter layer, the third image elements rendering a fourth image.

4. The optical device according to claim 1, wherein the features that render the first image and the first and second image elements are provided in a same area of the substrate, the features and the first and second image elements being embedded together.

5. The optical device according to claim 1, wherein the first image and the second image are rendered separately.

6. The optical device according to claim 1, wherein the filter layer is a half tone screen.

7. The optical device according to claim 6, wherein the filter layer includes one of a single density and multiple densities.

8. An optical device, comprising:
  a substrate;
  a first filter layer provided on a first side of the substrate, the first filter layer including first features that reflect light rays that impinge thereon to render a first image and first gaps between the first features;
  a second filter layer provided on a second side of the substrate, the second filter layer including second features that reflect light rays that impinge thereon to render a second image and second gaps between the second features; and
  a first image layer provided on at least one of the first filter layer and the second filter layer, the first image layer allowing light rays to travel therethrough, the first image layer including:
    first image elements being vertically aligned with the first features or the second features to render the first image or the second image in reflected light; and
    second image elements provided within the first gaps between the first features or the second gaps between the second features, the second image elements being provided out of vertical alignment with the first features or the second features, the second image elements being laterally offset from the first image elements so that light transmitted through the first and second gaps travels through the second image elements and does not travel through the first image elements,
  the second image elements rendering a third image in transmitted light at a first side of the substrate.

9. The optical device according to claim 8, wherein the first features of the first filter layer are vertically aligned with the second features of the second filter layer.

10. The optical device according to claim 9, wherein the first image layer further includes third image elements provided within the first gaps between the first features or the second gaps between the second features, the third image elements rendering a fourth image.

11. The optical device according to claim 8, wherein the third image elements are provided on an opposite side of the substrate relative to the second image elements.

12. The optical device according to claim 10, wherein the first image layer further includes fourth image elements provided within the first gaps between the first features or the second gaps between the second features, the fourth image elements rendering a fifth image, the fourth image elements being laterally offset from the second and third image elements provided within the first gaps or the second gaps.

13. The optical device according claim 8, wherein the first image and the third image are a same image and include at least one of a same scale and a same alignment.

14. The optical device according to claim 8, wherein the first features of the first filter layer and the second features of the second filter layer are at least partially out of vertical alignment, the first features of the first filter layer being laterally shifted relative to the second features of the second filter layer.

15. The optical device according to claim 14, wherein relative positions of the first features of the first filter layer and the second features of the second filter layer define a plurality of light ray entry angles.

16. The optical device according to claim 15, wherein the first image layer further includes:
  third image elements provided within the first gaps or the second gaps; and
  fourth image elements provided within the first gaps or the second gaps, the fourth image elements being laterally displaced from the third image elements within the first gaps or the second gaps.

17. The optical device according to claim 16, wherein the third image elements render a fourth image when illuminated by light rays having a first entry angle and the fourth image elements render a fifth image when illuminated by light rays having a second entry angle.

18. A method of forming an optical device having a substrate, the method comprising:
  providing a filter layer on the substrate, the filter layer including features that reflect light rays that impinge thereon to render a first image and gaps between the features;
  providing an image layer on at least one of the filter layer or the substrate, the image layer allowing light rays to travel therethrough,
  providing first image elements within the image layer, the first image elements being vertically aligned with the features of the filter layer to render the first image in reflected light; and
  providing second image elements within the image layer, the second image elements being provided within the gaps between the features, the second image elements being laterally offset from the first image elements so that light transmitted through the gaps travels through the second image elements and does not travel through the first image elements, the second image elements rendering a second image in transmitted light at a first side of the substrate and a third image in transmitted light at a second side of the substrate, the third image being a flipped version of the second image, wherein the second side of the substrate is opposite to the first side of the substrate.

19. The method according to claim 18, wherein providing the filter layer and providing the image layer include placing the filter layer and the image layer in a same area of the substrate, the features and the first and second image elements being embedded together.

20. The method according to claim 18, wherein the second image elements are provided out of vertical alignment with the features of the filter layer.

21. The method according to claim 18, further comprising:
  providing a second image layer on the other of the substrate or the filter layer, the second image layer including third image elements provided in vertical alignment with the geometry of the features of the filter layer.

22. The method according to claim 21, wherein the third image elements render a fourth image in reflected light.

23. An optical device, comprising:
a substrate;
an image layer provided on the substrate, the image layer allowing light rays to travel therethrough; and
a filter layer provided on the image layer, the filter layer including features that reflect light rays that impinge thereon to render a first image and gaps between the features,
the image layer including image elements provided within the gaps between the features at a first side of the substrate, the image elements provided within the gaps being laterally offset from image elements provided vertically aligned with the features of the filter layer so that light transmitted through the gaps travels through the image elements provided within the gaps and does not travel through the image elements provided vertically aligned with the features of the filter layer,
the image elements being omitted within the gaps between the features at a second side of the substrate, the image elements rendering a second image in transmitted light at the first side of the substrate and a third image in transmitted light at the second side of the substrate, the third image being a flipped version of the second image, wherein the second side of the substrate is opposite to the first side of the substrate.

* * * * *